United States Patent Office 3,605,807
Patented Sept. 20, 1971

3,605,807
SWITCHING ELEMENTS FOR A HYDRAULIC OR
PNEUMATIC CONTROL SYSTEM
Hanns-Dieter Paschke, Neckarsulm,
Olgaweg 6, Germany
Filed Sept. 9, 1968, Ser. No. 758,512
Claims priority, application Germany, Sept. 13, 1967,
P 16 50 501.4; Jan. 26, 1968, P 16 75 370.1; Feb.
16, 1968, P 16 75 511.6
Int. Cl. F16k 31/143
U.S. Cl. 137—596.18
3 Claims

ABSTRACT OF THE DISCLOSURE

A fluid switching valve having input, output, and control lines, and a valve chamber formed with valve seats for the control line and the ouput line, and containing a disc valve which is movable in the chamber between the valve seats, under the influence of the pressure in the control line, there being a fluid clearance around the disc valve which is of smaller effective area than the cross-sectional area of the input line. The valve may be arranged optionally either to close or open the output line on an increase in pressure in the control line, and may also be arranged to connect the output line selectively to a relief port. The valve may be included in digital switching circuits provided on digital logic function, for example AND, OR, and NOR.

---

Conventional control systems for hydraulic plant commonly incorporate multi-way valves usually in the form of sleeve valves or flat slide valves which are manually or electromagnetically actuated in order to create a predetermined flow path. The requirement of a good seal in such valves involves special difficulties, such a seal being necessary to minimise the oil leakage which occurs in such valves and leads to loss of pressure and efficiency. Since conventional multi-way valves must have a clearance-fit seal, it is necessary to provide a very close fit in order to achieve a satisfactory seal and this means that manufacture is expensive, that there is always a latent risk of jamming and that such valves are affected by dirt and temperature changes. In addition, such multi-way valves have the basic drawback that, due to the clearance-fit seal the pressure head is restricted and wear causes deterioration of the seal. Since actuation of the valve usually requires regulating forces, the multi-way valves are normally actuated electromagnetically with the result that in addition to the hydraulic control system an electrical switching system must be provided.

The invention is based on the realisation that the above-mentioned difficulties and disadvantages may be avoided by providing, in hydraulic systems, the necessary flow paths from the outset and arranging for control to occur by opening and closing said flow paths. To this end the invention proposes switching elements which are cheap to produce, are reliable, can be used over a wide range of pressures, provide an effective seal over a wide temperature range, are not subject to excessive wear such as to affect performance and require little or no mechanical regulating forces, so that the use of any additional switching system is not necessary.

Broadly the invention consists in a switching element for a hydraulic or pneumatic control system which establishes or breaks a connection between two main input and output lines according to the pressure in a control line, comprising a housing defining a chamber which communicates with an input line, and with an output line for the pressure medium, and with a control line, a disc valve movable in the chamber and influenced by the pressure in the control line so as to cooperate selectively with two valve seats, of which one is associated with the control line and the other with the output line, the effective cross-sectional area of the control line being greater than the effective cross-sectional area of a clearance between the wall of the chamber and the disc valve.

The switching delement may be such that at low pressure (tank pressure) in the control line it connects the input line to the output line (such a switching element being referred to herein as an n-hydrosistor in imitation of the terms commonly used in electronics), or such that it connects the input line to the output line at high pressure in the control line (p-hydrosistor). In the case of an n-hydrosistor the valve seats are conveniently formed by the end surfaces of the housing defining the chamber, the control line being led in through one of the end surfaces, whilst the input and output lines are led in through the other end surface, preferably substantially in concentric relationship to each other. If there is no pressure or only tank pressure in the control line, the pressure in the input line will lift the disc valve so as to close the control line and establish a connection between the input line and the output line. If a higher pressure, such as system pressure, is applied to the control line, the disc valve will be pressed against its other valve seat so as to break the connection between the input and output lines. Since the effective cross-sectional area of the control line is greater than that of the annular clearance between the disc valve and the wall of the cylindrical chamber it will always be possible for a pressure to build up on the control line side of the disc valve sufficient to cause the disc valve to move across to its other end position. It will be seen that such a switching element operates with static seals, that is, the disc valve rests, in both positions, against a valve seat, thus minimising or eliminating leakage. The witching element is thus very suitable for high pressures.

In the p-hydrosistor the interior of the housing is preferably divided by a partition into two chambers each of which contains a valve disc, the two valve discs together forming the disc valve, said valve discs being held apart by a distance piece which passes through an aperture in the partition and which is longer than the thickness of the partition, the partition surfaces facing the sub-chambers forming valve seats with which the disc valve cooperates selectively, the control line being led into the first chamber and the input line being led into the second chamber, whilst the output line leads out from the aperture in the partition. When pressure occurs in the control line the valve disc associated therewith will be pressed against its seat so as to cut off the first sub-chamber from the output line, the fact that the control line has a larger cross-sectional area than the annular clearance between the disc and the chamber wall again being the reason for an adequate pressure build-up. At the same time, the distance piece will lift the over valve disc from its seat so as to establish a connection between the input line opening into the second chamber and the output line leading from the aperture in the partition. In order to minimise throttling and flow losses, the cross-sectional area of the annular clearance between the output line valve disc and the surrounding wall is made larger than that of the annular clearance between the control line valve disc and the surrounding wall. If the control line is depressurised, the system pressure in the input line will displace the disc valve such that the connection between the input line and the output line is broken. The output line valve disc bears against its seat, whilst the control line valve disc is lifted from its seat. If the pressure level is higher in the output line than in the control line, the control line valve disc will be further displaced so as to cut off the control line. In all cases static seals are present for cutting off the various lines.

It will be appreciated from the above that both n-type and p-type hydrosistors can be switched by the pressure already present in the control line. Each switching element comprises a small number of mainly similar parts, which reduces production costs considerably. The switching elements of the invention may be combined in any desired manner in order to arrive at a desired circuit, and the connecting lines may be formed by channels cut or etched in the abutting faces of two plates having suitable recesses for the accommodation of the hydrosistors, in the manner known in pneumatic control systems.

The disc valves in the switching elements of the invention may, of course, be spring biased or lifted from their seats manually in order to initiate a switching operation, if necessary.

The switching elements of the invention may take the form of power switches or of control switches, the difference between the two being essentially a matter of size only.

The switching elements of the invention may be used for the construction of logic circuits, it being possible to carry out any switching task digitally by means of AND and OR circuits, negative relay elements (negating elements) and positive relay elements (amplifying elements).

However, one particular difficulty in hydraulic and peumatic systems is that cutting off the supply of pressure medium is not, in general, sufficient to carry out a switching operation, since this does not produce an immediate reduction in pressure but the movement of the switching elements may, in some cases, even produce a pressure pulse in the consumer line, or the reduction of pressure may occur so slowly that the switching time becomes unduly long.

According to a further aspect the invention is based on the realisation that perfect hydraulic or pneumatic wsitching can be achieved only when either system pressure or relief pressure (atmospheric or tank pressure) is present at the consumer at each switching operation. In accordance with the invention, this can be achieved by designing the hydraulic or pneumatic circuit with pairs of p-type and n-type hydrosistors, the control lines of the p-type and n-type hydrosistors of each pair being interconnected, whilst their inputs and outputs are connected either directly or via further pairs of p-type and n-type hydrosistors to the pressure source, to the consumer or to relief respectively, such that either only system pressure or only relief is present at the consumer at each switching operation.

A positive AND circuit, that is, a cinrcuit in which system pressure is present at the consumer only when all of the control lines are under pressure, conveniently comprises at least two pairs of p-type and n-type hydrosistors, the p-type hydrosistors being connected in series with the input of the first p-hydrosistor (in the direction of flow from the pressure source to the consumer) connected to the pressure source, whilst the n-type hydrosistors are connected in parallel with their outputs connected to relief and their inputs connected to the consumer. When the control lines of all of the hydrosistors are under pressure, the consumer will be connected to the pressure source via the p-hydrosistors, now open, whilst the n-hydrosistors are closed and the connection between the consumer and relief is broken. If there is no pressure in the control lines of one pair of hydrosistors, the n-type hydrosistor of said pair will be open, so that the consumer will be connected to relief via said n-hydrosistor.

A negative AND circuit, that is a circuit in which system pressure is normally present at the consumer and relief pressure is present at the consumer only when all of the control lines are under pressure, differs from the positive AND circuit only in that the input of the first p-hydrosistor (in the direction of flow from the consumer to the tank or atmosphere) is connected to the consumer and the output of the last p-hydrosistor is connected to relief, whilst the outputs of the n-hydrosistors are connected to the consumer and their inputs to the pressure source. A positive OR circuit, that is a circuit in which a pressure signal in one of the control lines produces system pressure at the consumer, likewise comprises at least two pairs of p-type and n-type hydrosistors, in this case the p-type hydrosistors being connected in parallel with their inputs connected to the pressure source and their outputs to the consumer, whilst the n-type hydrosistors are connected in series, the input of the first n-hydrosistor (in the direction of flow from the consumer to the tank or atmosphere) being connected to the consumer and the output of the last n-hydrosistor being connected to relief. When there is no pressure in the control lines of all pairs of hydrosistors, the consumer will be connected to relief. When, however, pressure is applied to the control lines of one pair of hydrosistors, the n-hydrosistor of this pair will be closed and the p-hydrosistor opened, by which means the consumer will be cut off from relief and connected to the pressure source.

A negative OR circuit, that is a circuit in which system pressure is normally present at the consumer but relief pressure is present at the consumer when a pressure signal occurs in one control line, differs from the positive OR circuit simply in that the inputs of the parallel p-hydrosistors are connected to the consumer and their outputs are connected to relief, the n-hydrosistors being connected in series, the input of the first n-hydrosistor (in the direction of flow from the pressure source to the consumer) is connected to the pressure source and the output of the last n-hydrosistor is connected to the consumer.

A negative relay circuit (negating element) comprises a pair of p-type and n-type hydrosistors, the input of the n-hydrosistor being connected to the pressure source, whilst its output and the input of the p-hydrosistor are connected to relief. When pressure is applied to the control lines, which are interconnected, the n-hydrosistor closes and the p-hydrosistor opens so that the consumer is connected to relief. When there is no pressure in the control lines, the n-hydrosistor opens and the p-hydrosistor closes with the result that system pressure is applied to the consumer.

A positive relay circuit is formed similarly, except that the input of the p-hydrosistor of the pair of p-type and n-type hydrosistors is connected to the pressure source, whilst its output and the input of the n-hydrosistor are connected to the consumer and the output of the n-hydrosistor is connected to relief.

By suitably combining the above basic circuits, all of which are characterised by the use of pairs of hydrosistors, each pair consisting of one p-type and one n-type hydrosistor, any switching task may be solved digitally by applying or withholding pressure in the interconnected control lines of the pairs.

The use of pairs of n-type and p-type hydrosistors calls for a relatively large number of n-type and p-type hydrosistors in the more extensive circuits. To reduce the cost, the p-hydrosistors may be modified so as to include the function of n-hydrosistors.

The normal p-hydrosistor, described above, has a housing which includes two chambers which are separated from each other by a partition and which each contain a valve disc, the two valve discs together forming the disc valve, said valve discs being held apart by a distance piece which passes through an aperture in the partition and which is longer than the thickness of the partition, the partition surfaces facing the chambers forming valve seats which the disc valve cooperates alternately, the control line being led into the first chamber and the input line being led into the second chamber, whilst the output line leads out from the aperture in the partition. This structure can be modified to form a p-n hydrosistor as follows. From the partition surface facing the chamber into which the control line opens there is provided a relief line which can be connected to the tank or the atmosphere and the output line in effect at least partly surrounds the relief line.

By this slight modification a p-hydrosistor is converted to an n-hydrosistor in the region of one of its chambers, the switching element incorporating both the function of the n-hydrosistor and that of the p-hydrosistor. Thus, when pressure is applied to the control line, the connection betwen the output line and the relief line is broken and a connection is established between the input and output lines. This function corresponds to the normal function of the p-hydrosistor. When, however, there is zero pressure in the control line, the connection between the input and output lines is broken, whilst at the same time a connection is established between the output line and the relief line, and this latter function corresponds to the function of the n-hydrosistor, which connects the two main lines together when there is no pressure in the control line. This combined n-type/p-type hydrosistor also fulfills the condition of providing either system pressure or zero pressure at the consumer, that is, in the output line. As previously mentioned, when there is pressure in the control line, the output line is connected to the input line, that is, to system pressure, and when there is no pressure in the control line the output line is connected to the relief line, that is, to zero pressure. Thus the combined p-type/n-type hydrosistor forms a complete amplifying element or a positive relay circuit as a single entity.

The combined n-type/p-type hydrosistor can, of course, be used for AND and OR circuits, only two n-p- hydrosistors being necessary for an AND circuit or for an OR circuit. To form an AND circuit the relief lines of at least two n-p-hydrosistors are connected in parallel and connected to relief, whilst the first n-p-hydrosistor (from the pressure source to the consumer) has its input connected to the pressure source and its output connected to the input of the next n-p-hydrosistor, whose output is connected to the consumer. Thus the input and output lines of the n-p-hydrosistors are connected in series, whilst their relief lines are connected in parallel.

An OR circuit likewise comprises at least two n-p-hydrosistors, but their inputs are all connected to the pressure source, the relief line of the first combined hydrosistor (in the direction of flow from relief to the consumer) is connected to relief, the output of said hydrosistor is connected to the relief line of the next hydrosistor, whose output is connected to the consumer, or if further combined hydrosistors are used, to the relief line of the next hydrosistor.

The invention may be performed in various ways and a number of embodiments will now be described by way of example with reference to the accompanying drawings, in which FIG. 1 is a cross-section through an n-type hydrosistor in the closed position, FIG. 2 is a cross-section similar to FIG. 1 showing the hydrosistor in the open position, FIG. 3 shows a symbol for an n-type hydrosistor, FIG. 4 is a cross-section through a p-type hydrosistor when closed, FIG. 5 is a section through the p-type hydrosistor when open, FIG. 6 shows a symbol for a p-type hydrosistor, FIG. 7 illustrates a hydraulic circuit for the control of a linear-action motor, such as a double-action hydraulic cylinder, FIG. 8 shows a positive AND circuit with two control lines, FIG. 9 shows a symbol for the AND circuit shown in FIG. 8, FIG. 10 shows a positive OR circuit with two control lines, FIG. 11 shows a symbol for the OR circuit shown in FIG. 10, FIG. 12 shows a negative relay circuit (negating element), FIG. 13 shows the symbol for the circuit shown in FIG. 12, FIG. 14 shows a positive relay circuit, FIG. 15 shows a negative AND circuit with two control lines, FIG. 16 shows a negative OR circuit with two control lines, FIG. 17 is a longitudinal section through a combined n-p-hydrosistor, FIG. 18 is a section taken on the line 2—2 of FIG. 17, FIG. 19 shows a symbol for the n-p-hydrosistor, FIG. 20 shows an AND circuit comprising two n-p-hydrosistors, FIG. 21 shows an OR circuit comprising two n-p-hydrosistors, and FIG. 22 shows a modification of the n-hydrosistor shown in FIGS. 1 and 2.

With reference to FIGS. 1 and 2, there is shown an n-type hydrosistor which comprises a housing 1 having a cylindrical interior 2 bounded by circular end surfaces 3 and 4. To the end surface 3 there leads a control line 5 and to the end surface 4 there leads an output line 6, and an annular groove 7 surrounds the output line 6 concentrically and is connected to an input line 8. In the interior 2 there is loosely located a circular disc valve 9 adapted to cooperate sealingly with either the end surface 3 or the end surface 4 so as to close the control line 5 or to cover the output line 6 and the annular groove 7 and thus separate the input line 8 from the output line 6. In FIG. 1 the control line 5 is connected to the system pressure which is also applied to the input line 8. Since the pressure surface of the underside 11 of the disc valve 9 is of an area which is smaller than that of the upper side 10 by an amount corresponding to the cross-sectional area of the output line 6, the disc valve 9 bears sealingly against the end surface 4 to break the connection between the input line 8 and the output line 6. When the control line 5 is depressurised, for example by being connected to the system tank or reservoir, the pressure applied to the lower side 11 of the disc valve 9 via the annular groove 7 will be able to lift the disc valve 9 into the position shown in FIG. 2, in which the valve bears sealingly against the end surface 3 to cut off the control line 5. Thus it is not possible for pressure liquid to escape through the control line 5, and the pressure liquid supplied through the input line 8 can flow out through the output line 6 to the consumer. When the control line 5 is again put under system pressure, the said pressure will be able to cause the disc valve 9 to return to the position shown in FIG. 1, since, due to the flow of pressure liquid from the line 8 to the line 6, the pressure acting on the underside 11 of the disc valve 9 is lower. To ensure that the disc valve 9 can move into its closed position it is important that the effective cross-sectional area of the annular clearance 12 between the disc valve 9 and the wall 13 of the housing interior 2 should be smaller than the effective cross-sectional area of the control line 5.

The annular groove 7 may, alternatively, be located in the underside 11 of the disc valve or it may be replaced by a plurality of bores which are interconnected and disposed around the line 6, since such an arrangement has the same effect as an annular groove. In the present embodiment the annular groove 7 communicates with the input line. It is possible, however, for the annular groove to be connected to the output line and for the input line to open centrally into the interior 2. The concentric arrangement of input and output lines has the advantage that the same pressure conditions prevail at all points round the valve disc as determined by the pressure in the line communicating with the annular groove.

FIG. 3 shows the symbol used herein for the n-type hydrosistor shown in FIGS. 1 and 2, where ST represents the control line, P the input line and X the output line.

FIGS. 4 and 5 show a p-type hydrosistor in cross-section. It comprises a housing 1' having a cylindrical interior 2' divided into two chambers 15 and 16 by a partition 14. Each of the chambers contains a valve disc 17 and 18 respectively, and these valve discs together form a disc valve. In the partition 14 there is provided a central aperture 19 in which there is located a distance piece 20 which holds the two valve discs 17, 18 apart by a distance which is greater than the thickness of the partition 14. This prevents the valve discs from bearing against their valve seats, formed by the flanks 21, 22 of the partition, both at the same time.

Into the end surface 3' of the chamber 15 there leads a control line 5', whilst an input line 8' opens into the chamber 16. An output line 6' leads from the central aperture 19 in the partition 14.

This hydrosistor operates as follows. When the control line 5' is connected to the tank or relief, the pressure of the liquid supplied through the input line 8' lifts the valve disc 18 into its position shown in FIG. 4, in which it bears sealingly against the flank 22 to cut off the output line 6'. The distance piece 20 causes simultaneous lifting of the upper valve disc 17. If the pressure level in the output line 6' is higher than in the control line 5', the valve disc 17 will be pressed against the end surface 3' to cut off the control line 5'. When system pressure is applied to the control line 5', the upper valve disc 17 will be pressed against its lower seat 21, since its pressure surface has a larger area than that of the valve disc 18. At the same time the valve disc 18 is depressed from its seat 22 by the distance piece 20 so as to establish a connection between the input line 8' and the output line 6'. As in the case of the n-hydrosistor shown in FIGS. 1 and 2, it is important that the effective cross-sectional area of the annular clearance 12' between the valve disc 17 and the surrounding wall 13' should be smaller than the effective cross-sectional area of the control line 5' and smaller than the cross-sectional area of the connection between the chamber 15 and the output line 6'. FIG. 6 shows the symbol for the p-type hydrosistor of FIGS. 4 and 5, wherein ST' represents the control line, P' the input line and X' the output line.

The disc valve 9 and the valve disc 17 may have a rounded or tapered peripheral surface to prevent jamming when tilted.

It will be seen that both the n-type and the p-type hydrosistors are such that after switching has been effected no fluid flow can occur between the control line and the main lines (input and output lines).

FIG. 7 shows the circuit for a linear-action motor L which may be moved hydraulically from left to right or from right to left and may be held, that is, hydraulically locked in any position. Control is effected by means of four n-type hydrosistors A1, A2, A3 and A4 which are connected up in pairs, the control lines ST of A1 and A2 being interconnected, as are those of A3 and A4. The input lines P of A1 and A3 are connected to the pressure source (+), and the output lines X of A2 and A4 are connected to the tank (−). The output line X of A1 is connected to the input line P of A4 and also to the right-hand end of the linear-action motor L, and the output line X of A3 is connected to the input line P of A2 and also to the left-hand end of the motor L. A switching line R leads to the control lines of A1 and A2, and a switching line S leads to the control lines of A3 and A4. When R is connected to + and S to −, A1 and A2 will be closed and A3 and A4 open, that is, the motor L will move from left to right, as represented in the drawing, since the left-hand side of the motor will be supplied with pressure liquid via A3, whilst the right-hand side will be connected to − via A4. When R is connected to − and S to +, the motor L will move from right to left. Then R and S are both connected to +, all of the n-hydrosistors will be closed with the result that the motor L will be hydraulically locked.

The basic logic circuits comprising n-type and p-type hydrosistors are shown in FIGS. 8 to 16. In these figures the n-type hydrosistors are designated by A and the p-type hydrosistors by B. The inputs of the n-type hydrosistors are designated P, their outputs X and their control lines ST. The inputs of the p-type hydrosistors are designated P', their outputs X' and their control lines ST'. In all of the circuits hydrosistor pairs are used, each of which comprises one n-type hydrosistor and one p-type hydrosistor, the combination being indicated in FIGS. 8, 10, 12 and 14 by dotted rectangles. The control lines ST and ST' of the n-type and p-type hydrosistors of a pair are interconnected and also connected to an external control line R or S. 0 represents atmospheric or tank pressure and + stands for system pressure produced by a pressure source (not shown) V represents a consumer at which the desired output signal occurs.

Reference is now made to FIG. 8, in which there is shown a positive AND circuit. It comprises two pairs I and II of n-type and p-type hydrosistors A and B respectively. The p-type hydrosistors $B_I$ and $B_{II}$ are connected in series: the input P' of the first p-type hydrosistor $B_I$ (from the pressure source to the consumer) is connected to the pressure source and the output X' of the second p-type hydrosistor $B_{II}$ is connected to the consumer V. The n-type hydrosistor $A_I$ and $A_{II}$ are connected in parallel and their outputs X are connected to 0, whilst their inputs P are connected to the consumer V. When there is zero pressure in the external control lines R and S, $A_I$ and $A_{II}$ will be open and $B_I$ and $B_{II}$ will be closed so that V will be connected to 0. When pressure is applied to one of the external control lines R or S, $A_I$ or $A_{II}$ will be closed and $B_I$ or $B_{II}$ will be opened, but V will still be connected to 0 via the open n-hydrosistor $A_{II}$ or $A_I$. Only when pressure is applied to both of the external control lines R and S will both $A_I$ and $A_{II}$ be closed and $B_I$ and $B_{II}$ open so that V will receive system pressure +. Since there is zero pressure in the outputs X of $A_I$ and $A_{II}$, the disc valves of $A_I$ and $A_{II}$ will be under the pressure in the control lines ST and will therefore rest against their valve seats thus breaking the connection between V and 0. The symbol used for the AND circuit shown in FIG. 8 is illustrated in FIG. 9. It will be appreciated that more than two pairs of n-type and p-type hydrosistors may be used if it is desired that system pressure be applied to V only when pressure has been applied to more than two external control lines.

The positive OR circuit illustrated in FIG. 10 also comprises two pairs I and II. The p-type hydrosistors $B_I$ and $B_{II}$ are connected in parallel with their inputs P' connected to + and their outputs X' to V. The n-type hydrosistors $A_I$ and $A_{II}$ are connected in series with the input P of the n-hydrosistor $A_{II}$ connected to V and the output X of the n-hydrosistor $A_I$ connected to 0. When there is zero pressure in the external control lines R and S, $A_I$ and $A_{II}$ will be open and $B_I$ and $B_{II}$ will be closed, so that V will be connceted to 0. When pressure is applied to one or both of the external control lines R and/or S, $A_I$ and/or $A_{II}$ will be closed and $B_I$ and/or $B_{II}$ will be open, with the result that V will be connected to +. The symbol for the OR circuit is shown in FIG. 11. Again, it will be appreciated that more than two pairs of n-type and p-type hydrosistors may be used if it is desired that system pressure be applied to V when pressure is applied to any one of a number of external control lines exceeding two.

The circuit shown in FIG. 12 corresponds to the negating element of electronics and comprises a pair of n-type and p-type hydrosistors A and B, the input P of A being connected to +, its output X and the input P' of B being connected to V and the output X' of B being connected to 0. When there is zero pressure in the external control line R, A will be open and B closed, which means that V will be connected to +. When pressure is applied to the external control line R, A will be closed and B opened so that V will be connected to 0. The symbol used for this circuit is illustrated in FIG. 13.

The reversal of the circuit shown in FIG. 12 is illustrated in FIG. 14. It is termed a positive relay circuit, as V is connected to + when there is pressure in the external control line R. This circuit also comprises just one pair of n-type ad p-type hydrosistors A and B, the input P' of B being connected to +, its output X' and the input P of A being connected to V and the output of A being connected to 0. When there is zero pressure in the external control line R, A will be open and B closed, which means that V will be connected to 0. When pressure is applied to the external control line R, A will be closed and B opened, so that V will be connected to +. In this condition, due to the pressure in ST and the connection between X and 0, the disc valve in A will be firmly pressed against its seat to effectively break the connection between V and 0.

FIG. 15 shows a negative AND circuit, in which, unlike the circuit shown in FIG. 8, system pressure is normally applied to the consumer, and the consumer is only under zero pressure when pressure is applied to both or all of the external control lines R, S. The p-type hydrosistors $B_I$ and $B_{II}$ are again connected in series, the input P' of the first p-hydrosistor $B_{II}$ (in the direction from V to the first pressure source) being connected to V, whilst the output X' of the second p-hydrosistor $B_I$ is connected to 0. The n-type hydrosistors $A_I$ and $A_{II}$ are connected in parallel and their inputs P are connected to the pressure source +, whilst their outputs X are connected to V. When pressure is applied to none or only one of the external control lines R or S, V will be connected to the pressure source. Only when pressure is applied to all of the external control lines R and S will V be connected to 0. A negative OR or NOR circuit is shown in FIG. 16. In this circuit, unlike the circuit shown in FIG. 10, V is under system pressure when no pressure is applied to all of the external control lines R and S. When pressure is applied to one or all of the external control lines R and/or S, V will be connected to 0. The p-type hydrosistors $B_I$ and $B_{II}$ are again connected in parallel, their inputs P' being connected to V and their outputs X' to 0. The n-type hydrosistors $A_I$ and $A_{II}$ are connected in series, and the input P of the first n-hydrosistor $A_I$ (from + to V) is connected to +, whilst the output X of the second n-hydrosistor $A_{II}$ is connected to V. When none of the external control lines R and S is under pressure, V is connected to +, but when a pressure signal occurs in one or both of the external control lines R and/or S, V will be connected to 0.

The basic circuits shown in FIGS. 8 to 16 are characterised by the use of pairs of n-type and p-type hydrosistors.

In FIGS. 17 and 18 there is illustrated a combined n-p-type hydrosistor which combines the functions of the n-type hydrosistor shown in FIG. 1 and the p-type hydrosistor shown in FIG. 4.

The n-p-type hydrosistor is somewhat similar to the p-type hydrosistor shown in FIG. 4 and comprises a housing 1'' having two chambers 15' and 16' separated by a partition 14' and each containing a valve disc 17', 18', which valve discs together form a disc valve. In the partition 14' there is provided an aperture 19' which accommodates a distance piece 20' adapted to hold the valve discs 17' and 18' apart by a distance greater than the thickness of the partition 14'. This prevents the valve discs from resting on the valve seats formed by the flanks 21' and 22' of the partition 14' both at the same time.

The control line 5'' has its opening in the end surface 3'' of the chamber 15', and the input line 8'' opens into the chamber 16'. Preferably, the input line 8'' is disposed near the partition 14', as illustrated, and not in the end surface 4' of the chamber 16', to prevent accidental closing of the input line by the valve disc 18'. The output line 6'' leads from the aperture 19' in the partition 14'.

Thus far, the construction is identical to that of the p-hydrosistor illustrated in FIGS. 4 and 5. Additionally, however, there is provided a relief line 30 which can be connected to the tank or to atmosphere and which leads from the surface 21' of the partition 14' facing the chamber 15' into which the control line 5'' opens. As can be seen in FIG. 18, an approximately half-moon-shaped recess 6a is provided in the surface 21', partly surrounding the opening 30' of the relief line 30, and communicating with the aperture 19'. The output line 6'' thus in effect partly surrounds the relief line 30.

The mode of operation is as follows. When there is no pressure in the control line 5'', the pressure of the pressure medium supplied through the input line 8'' presses the valve disc 18' up into its position shown in FIG. 17, that is, against the flank 22' so as to break the connection between the input line 8'' and the output line 6''. The distance piece 20' causes the upper valve disc 17' to be lifted, with the result that the output line 6'' communicates with the relief line 30. Here again the valve disc 17' will be passed against the end surface 3'' of the chamber 15' of the output line 6'' is under a higher pressure than the control line 5'', which prevents pressure medium from flowing into the control line 5''.

If pressure is now applied to the control line 5'', the upper valve disc 17' will be pressed down on to its seat 21', since its pressure area is greater than that of the valve disc 18' and the space beneath the disc 17' is connected to zero pressure. This breaks the connection between the output line 6'' and the relief line 30. At the same time, however, the valve disc 18' is lifted from its seat 22' by the distance piece 20' so that a connection between the input line 8'' and the output line 6'' is established. If the relief line is connected to zero, that is, to the tank or the atmosphere, the output line 6'' will be under either zero pressure (when the control line 5'' is not under pressure) or system pressure (when pressure is applied to the control line 5''). Thus the conditions for satisfactory hydraulic switching are fulfilled by a single switching element.

For satisfactory operation it is again important that the effective cross-sectional area of the annular clearance 12'' between the valve disc 17' and the surrounding wall 13'' should be smaller than the effective cross-sectional area of the control line 5'' and smaller than the cross-sectional area of the connection between the chamber 15 and the output line 6''.

FIG. 19 shows the symbol used for the n-p-type hydrosistor, wherein ST'' represents the control line 5'', P'' the input line 8'', X'' the output line 6'' and Y the relief line 30.

An AND circuit incorporating two n-p-hydrosistors I and II is shown in FIG. 20. It will be seen from this figure that the input and output lines of the n-p-type hydrosistors are connected in series, the input line P'' of the first n-p-type hydrosistor I (in the direction of flow from the pressure source + to the consumer V) being connected to the pressure source + and the output line X'' of the last n-p-type hydrosistor II being connected to the consumer V. The Y-lines of both n-p-type hydrosistors are connected to 0. When neither of the control lines ST'' is under pressure, the consumer V will be connected to 0 via the Y-line of the hydrosistor II. The same applies when pressure is applied to only the control line ST'' of the hydrosistor I. If pressure is applied to only the control line ST'' of the hydrosistor II, V will still remain connected to 0 via X'' and P'' of the hydrosistor II and X'' and Y of the hydrosistor I. Only when pressure is applied to the control lines ST'' of both of the n-p-type hydrosistors I and II will V become connected to + this connection occurring via P'' and X'' of I and P'' and X'' of II. Thus, again, V is connected either to zero or to system pressure.

It will be appreciated that more than two n-p-type hydrosistors may be used, if it is desired that system pressure be applied to V when pressure is applied to more than two control lines.

The OR circuit shown in FIG. 21 is similarly designed, except that the Y-line of the n-p-type hydrosistor I is connected to 0, its input line P″ is connected to + and it soutput line X″ to the Y-line of the n-p-type hydrosistor II, whose input line P″ is also connected to + and whose output line X″ is connected to V. If there is no pressure in the control line ST″ of I and II, V is connected to 0 via X″ and Y of II and X″ and Y of I. When pressure is applied to ST″ of I, P″ of I will be connected to X″ of I, which means that + will be applied to Y of II, and since Y of II communicates with X″ of II when there is no pressure in ST″ of II, the system pressure + will pass through to V. When pressure is applied only to ST″ of II, V will be directly connected to + via P″ and X″ of II. The same applies when pressure is applied to both ST″ of I and ST″ of II. Again, more than two n-p-type hydrosistors may be used in a similar manner if desired.

FIG. 22 shows a modification of the 'n-hydrosistor illustrated in FIGS. 1 and 2, resulting in a combined p-n-type hydrosistor. In this case, the output line 6 opens into a chamber 34 when has an output aperture 35 and a relief outlet 36 which may be connected to the tank or to atmosphere. In the chamber 34 there is provided a further disc valve 37 which is connected to the first disc valve 9 by a distance piece 38 and which controls the opening 36a of the relief line 36. The opening 36a is, as apparent, in the end surface 39 of the chamber 34 facing the disc valve 37 and including the output line 6. The output aperture 35 is located, for example in the peripheral wall 40 of the chamber 34, such that it cannot be closed by the disc valve 37.

The mode of operation is as follows. When pressure is applied to the control line 5, the disc valve 9 will be pressed against its seat 4 so as to break the connection between the input line 8 and the output line 6. At the same time, the disc valve 37 is lifted from its seat 39 to establish a connection between the relief line 36 and the output aperture 35. When there is no pressure in the control line 5, the disc valve 9 will be lifted from its seat 4 by the pressure in the input line 8 as described with reference to FIG. 2 and the pressure liquid can flow through the output line 6 into the chamber 34. The pressure built up in the chamber 34 will then press the dic valve 37 against its seat 39 so as to close the relief line 36. The pressure liquid may now flow through the output aperture 35 to the consumer. As in the case of the n-p-type hydrosistor illustrated in FIGS. 17 and 18 there is either system pressure or relief pressure at the output aperture 35 and this at the consumer. The p-n-type hydrosistor described with reference to FIG. 22 may be used in logic circuits similar to those shown in FIGS. 20 and 21.

I claim:

1. A switching element for a hydraulic or pneumatic control system which establishes or breaks a connection between a main input and a main output line according to the pressure in a control line, comprising a housing defining a chamber having a cylindrical side wall and two opposite, parallel end walls and a valve member comprising a disc lying parallel with said end walls and spaced by a clearance from said side wall freely movable within said chamber in a direction perpendicular to said end walls, a control port opening through one of said end walls and an input port and an output port opening through the other end wall, the input port communicating with an annular groove which surrounds the output port, said valve member cooperating alternatively with one or other of said end walls to close selectively the control port or both the input and output ports depending on the pressure in the control line, the effective cross-sectional area of the control line being greater than the effective cross-sectional area of the annular gap between the peripheral walls of the chamber and of the valve member.

2. A switching element as claimed in claim 1, in which the output line opens into an auxiliary chamber communicating with an output aperture and a relief line, and the said auxiliary chamber accommodates a further disc valve which is connected to the first disc valve in such a manner that it opens the relief line when the first disc valve bears against its valve seat which contains the openings of the input and output lines.

3. A switching element as claimed in claim 2, in which the said auxiliary chamber is separated from the main chamber containing the first disc valve by a wall in one surface of which the input line and the output line open, and from the other surface of which the relief line leads, said wall having a through passage which forms the output line and which accommodates the distance piece holding the two disc valves apart, the output aperture being located in a part of the auxiliary chamber which is displaced from the second disc valve, preferably in the peripheral wall of said chamber.

References Cited

UNITED STATES PATENTS

| 3,314,439 | 4/1967 | Samet | 137—112 X |
| 3,362,633 | 1/1968 | Freeman | 235—201ME |

FOREIGN PATENTS

| 401,548 | 5/1966 | Switzerland | 235—201ME |

OTHER REFERENCES

IBM, Technical Disclosure Bulletin, vol. 6, No. 2, July 1963.

Steiner, "Universal Modular System for Pneumatic Switching Controls," July 1964, vol. 11, No. 7, Process Control and Automation, p. 310.

ROBERT G. NILSON, Primary Examiner

U.S. Cl. X.R.

235—201ME; 251—63